UNITED STATES PATENT OFFICE.

GUSTAV SOBOTKA, OF NEW YORK, N. Y., ASSIGNOR TO THE AMERICAN DIAMALT CO., OF CINCINNATI, OHIO, A CORPORATION OF OHIO.

PROCESS OF MAKING MALT EXTRACTS RICH IN DIASTASE.

No. 860,340.     Specification of Letters Patent.     Patented July 16, 1907.

Application filed May 29, 1906. Serial No. 319,295.

*To all whom it may concern:*

Be it known that I, GUSTAV SOBOTKA, a citizen of the United States, residing in New York, in the borough of Manhattan, county and State of New York, have invented certain new and useful Improvements in Processes of Making Malt Extracts Rich in Diastase, of which the following is a specification.

Malt extracts which contain a high percentage of diastase could heretofore not be produced, notwithstanding the fact that the presence of diastase is of great value for hygienic and baking purposes, inasmuch as malt-extracts rich in diastase produce the ready digestion of starch containing alimentary substances, and when used in bakeries they impart to the bread and other articles a greatly improved flavor and taste, keep the same longer in moist condition, and produce a considerable saving in sugar, milk and other substances which are used in making baked articles.

In carrying out my improved process, malt rich in diastase is first carefully cleaned and passed through a crushing mill, after which the crushed malt is separated from the meal and fine grit. The crushing of the malt is carried on in such a manner that 70% of crushed malt and 30% of malt-meal and grit are obtained. The crushed malt is then treated with lukewarm water at a temperature of from 12.5 to 25° C. After a considerable quantity of diastase has been extracted by the water from the crushed malt, the mash is permitted to stand for some time, after which the clear extract is drawn off and concentrated *in vacuo* below 40° C. To the residue which remains in the mash-tub is then added the before-separated quantity of 30% of meal and grit and mashed with water at a temperature of 37.5° C. under continuous stirring. By the mashing the starch contained in the mash is converted into maltose and dextrin. The mash is then permitted to stand for a certain time, after which the extract which contains sugar and diastase is drawn off and concentrated *in vacuo* at the same temperature as the first extract. To the solid residue still remaining in the mash-tub, which has passed through two operations of extraction, the spent wash or slop of distilleries is added. This slop contains valuable substances in solution, such as a certain quantity of nitrogenous matter, dextrin and glucose and a small quantity of lactic acid, which serves to dissolve the valuable nitrogenous matter contained in the residue. The residue and slop are then mashed under addition of water, so that the sugar and dextrin still remaining in the residue are dissolved and not lost by decomposition. The thin extract thus obtained is drained off and condensed *in vacuo* in the same manner as the other two extracts. The extracts, obtained by the three mashing operations, are then mixed and condensed *in vacuo* to a syrup-like consistency.

This concentrated malt-extract, which contains a high percentage of diastase and nutritious substances, is added to the dough when making rye bread, or other articles to be baked. It has the advantage that it will greatly assist the yeast in fermenting the bread and improve the flavor and taste of the same, keep it moist and fresh for a greater length of time, and impart to the bread all the good qualities of leavened bread. It assists also, owing to the large quantity of diastase and protein-substances contained therein, in improving the digestibility of the bread.

Having thus described my invention, I claim as new and desire to secure by Letters Patent:

The process herein described of making malt extracts rich in diastase, which consists in separating the crushed malt from the malt meal and grit, mashing the crushed malt with lukewarm water for extracting the diastase therefrom, drawing off the extract and condensing the same, adding to the residue the meal and grit before separated from the crushed malt, mashing the mixture with water of a higher temperature than before, drawing off the second extract and condensing the same, then adding to the solid residue distillers' slop, mashing the residue with the slop, draining off the thin liquid extract and condensing the same, and finally mixing the different extracts obtained by the different operations and concentrating the same to a syrup-like consistency.

In testimony, that I claim the foregoing as my invention, I have signed my name in presence of two subscribing witnesses.

GUSTAV SOBOTKA.

Witnesses:
PAUL GOEPEL,
HENRY J. SUHRBIER.